UNITED STATES PATENT OFFICE.

CHARLES ROBERT SCHÜPPHAUS, OF ADAMS, MASSACHUSETTS, ASSIGNOR TO THE AMERICAN ZYLONITE COMPANY, OF NEW YORK, N. Y.

PYROXYLINE COMPOUND.

SPECIFICATION forming part of Letters Patent No. 410,204, dated September 3, 1889.

Application filed October 14, 1886. Serial No. 216,278. (No specimens.)

*To all whom it may concern:*

Be it known that I, CHARLES ROBERT SCHÜPPHAUS, a German subject, formerly of Crefeld, Rhenish Prussia, and now residing at Adams, county of Berkshire, and State of Massachusetts, have invented new and useful Improvements in Menstrua for Pyroxyline, of which the following is a specification.

In the manufacture of plastic compounds whose base is soluble pyroxyline, the solvent first used was commercial ethylic ether to form what is called "collodion," which ethylic ether commercially in 1848 always contained alcohol. Ethylic ether with ethylic alcohol is a perfect solvent of dinitro-cellulose; but the cost of this solvent, owing to the tax on alcohol, limits its use. Wood-naphtha or methylic alcohol is a very perfect solvent of dinitro-cellulose. The solvent preferred by most manufacturers is composed of camphor and alcohol, equal parts. The camphor being a solid and having high melting and boiling points, it is necessary to use some liquid to dissolve the camphor. The solution is usually either ethylic or methylic alcohol or amylic alcohol, or a mixture of them. These liquid solvents of camphor evaporate largely from the mass during manipulation of the rolls under hydraulic pressure and the steam heat of the presses, and by subsequently curing and molding the production of the plastic compound is enhanced in its cost considerably incident to the loss of weight from these causes. Notwithstanding a very large number of other solvents have heretofore been proposed, few, if any, have been found to give perfectly satisfactory results, and consequently ethylic and methylic and amylic alcohols continue to be used. Such being the state of the art, I commenced a series of investigations with a view to determine what solvents would serve either as a substitute in whole or in part for the alcohols mentioned, whether alone or in combination with camphor or with other liquid solvents. The result of my investigation has been that I have found the following materials useful for said purpose: propylic and isobutylic alcohol, which are colorless liquids having smell resembling that of alcohol, boiling-points 208° and 227° Fahrenheit, respectively. They are solvents in conjunction with camphor or any of its substitutes.

The proportions of the ingredients to be used are determined by the ultimate product desired, whether a collodion—*i. e.*, a liquid or varnish compounds—or whether a solid mass that may be molded or worked into various shapes.

Having thus described my invention, what I claim is—

1. In the manufacture of pyroxyline compounds, a varnish or plastic composition consisting of nitro-cellulose in conjunction with propylic alcohol, substantially as described.

2. In the manufacture of pyroxyline compounds, a varnish or plastic composition consisting of nitro-cellulose in conjunction with isobutylic alcohol, substantially as described.

In testimony whereof I affix my signature in presence of two witnesses.

CHAS. ROBERT SCHÜPPHAUS.

Witnesses:
GEO. M. MOWBRAY,
WILLIAM WILLIAMS.